United States Patent [19]

Engebretsen

[11] E Re. 29,425

[45] Reissued Oct. 4, 1977

[54] TRASH COMPACTOR AND BAG SYSTEM

[75] Inventor: Einar O. Engebretsen, Troy, Ohio

[73] Assignee: Hobart Corporation, Troy, Ohio

[21] Appl. No.: 647,162

[22] Filed: Jan. 7, 1976

Related U.S. Patent Documents

Reissue of:

[64] Patent No.: 3,756,144
Issued: Sept. 4, 1973
Appl. No.: 214,804
Filed: Jan. 3, 1972

U.S. Applications:

[63] Continuation-in-part of Ser. No. 184,038, Sept. 27, 1971, Pat. No. 3,807,299.

[51] Int. Cl.[2] ..... B30B 15/30

[52] U.S. Cl. ..... 100/215; 100/229 A; 229/53

[58] Field of Search ..... 100/218, 215, 229 R, 100/229 A; 229/53

[56] References Cited

U.S. PATENT DOCUMENTS

| | | | |
|---|---|---|---|
| 2,920,670 | 1/1960 | Mohlmann | 229/53 X |
| 3,537,390 | 11/1970 | Hinkel et al. | 100/229 A |
| 3,613,566 | 10/1971 | Shapleigh et al. | 100/218 |
| 3,667,381 | 6/1972 | Bottas et al. | 100/229 A |

FOREIGN PATENT DOCUMENTS

| | | | |
|---|---|---|---|
| 1,962,865 | 6/1967 | Germany | 100/229 A |

*Primary Examiner*—Billy J. Wilhite
*Attorney, Agent, or Firm*—Biebel, French & Nauman

[57] ABSTRACT

A trash compactor includes a container and a ram for compacting waste materials deposited therein, and a reusable liner positioned within the container receives the waste material, and facilitates removal of the waste material after compaction thereof. The liner has interfitting sections each with upstanding sidewalls and a bottom wall with one side wall of each of the sections being shortened to permit their ready assembly and disassembly. A tubular bag of seamless plastic sheet material having one sealed end is placed in the liner. The bag has a cuff portion which folds over the upper end of the liner and the container. Holes in the cuff portion engage buttons on the exterior of the container. The bag is longer than the liner depth to permit the sealed bag end to bunch in the bottom of the liner, and when a bag of compacted trash is removed, the material drops to the sealed end of the bag leaving an excess at the cuff portion for closing the open end of the bag. The holes may then provide a means for engaging a tie to close the bag.

5 Claims, 9 Drawing Figures

TRASH COMPACTOR AND BAG SYSTEM

Matter enclosed in heavy brackets [ ] appears in the original patent but forms no part of this reissue specification; matter printed in italics indicates the additions made by reissue.

CROSS REFERENCE TO RELATED APPLICATION

This application is a continuation-in-part of copending application Ser. No. 184,038, filed Sept. 27, 1971, *now U.S. Pat. No. 3,807,299* and assigned to the asignee of this application.

BACKGROUND OF THE INVENTION

A number of domestic trash compactor units utilize disposable bags which are placed within the compactor to receive the refuse and into which the material is compacted. Heretofore such bags have been generally of a special, laminated construction which incorporates layers for strength and other layers for moisture proofing. These bags are relatively expensive and they represent a continuing considerable expense for the compactor user, but lighter weight bags have not been particularly successful in these units because such bags tend to tear and tend to be drawn into the container during compaction, thus become useless and only adding to the difficulty of removing the commpacted trash.

Other units of this type utilize a one-piece, more or less self-supporting container, into which the waste material is deposited directly and subsequently compacted. With this type of container problems arise in removing the compacted material from the container. While tapering the container side walls may provide some alleviation of this problem, it will be seen that this results in a loss of container volume and of course, there may still be difficulty in removing the compacted materials particularly if it is wet or sticky. Furthermore, wet or sticky materials tend to leave soil on the container, causing odor and sanitation problems which require that the container be washed frequently.

SUMMARY OF THE INVENTION

The present invention comprises a compactor which utilizes a special disposable bag, preferably supported within a multi-piece composite liner of a substantially rigid, self-supporting material, which in turn is supported in and removable from the trash receiving container of the machine. The bag is preferably constructed as a seamless tubular member having one sealed end, of a length sufficiently greater than the container depth permitting the sealed end of the bag to bunch in the bottom of the container (or liner where used), and leaving a cuff portion for folding over the upper end of the container.

Holes in the cuff portion are positioned to engage over buttons or equivalent hooking members to hold the bag against friction forces tending to draw it into the container during compacting operations. The bunched end of the bag avoids stress on the sealed end during compaction, and also leaves room for compacted trash to drop into the sealed bag end as the bag is removed, thus leaving an excess of material at the cuff portion for tieing the open upper end of the bag.

Because the liner is formed as two, substantially rigid sections, when it is used the compacted material is readily removed by separating the two liner sections to free the bag.

The principal object of the invention is to provide an inexpensive bag particularly adaptable for use in trash compacting machines; to provide such a bag which will resist the friction of compacting forces tending to draw the bag into the machine's container; to provide a seamless tubular bag with a sealed folded end and a cuff portion at its open end including holes dimensioned for a force fit over retainer buttons or hooks at the upper exterior of the container; and to provide such a bag of a length sufficiently greater than the depth of the container to allow the sealed end of the bag to bunch into a slack condition at the bottom of the container.

Other objects and advantages of the invention will be apparent from the following description, the accompanying drawings and the appended claims.

DESCRIPTION OF THE PREFERRED EMBODIMENTS

Figure 1:
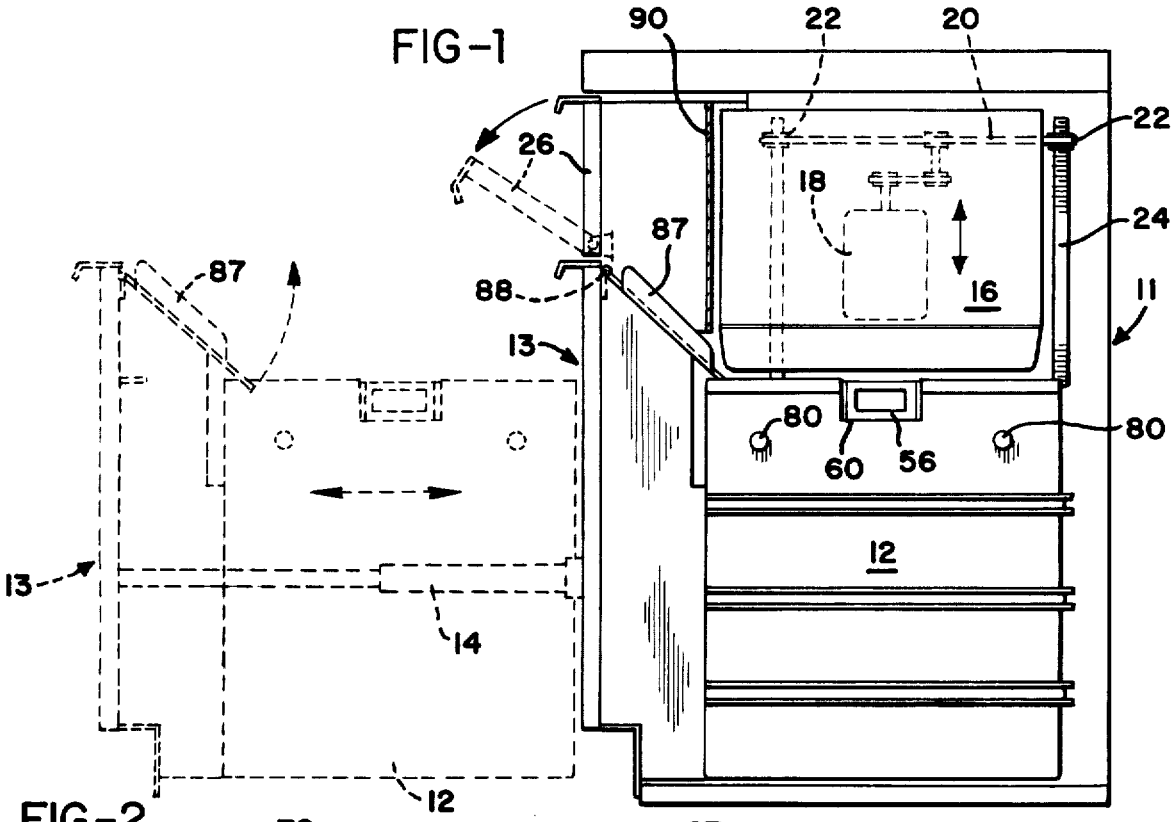
FIG. 1 is a side elevational view with the side cover removed, showing the container in its withdrawn position in the dotted lines.
Figure 2:
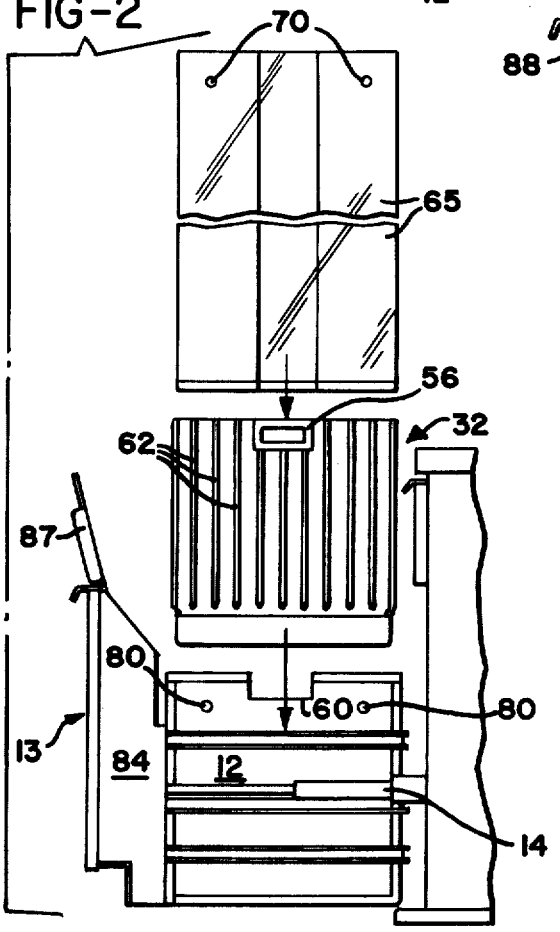
FIG. 2 is an exploded side view with the container retracted and the liner and bag above [its] *it;*

As seen in FIGS. 1 and 2 of the drawings, a typical compactor in which the bag of the present invention finds utility includes an upstanding cabinet 11 housing a trash container or receptacle 12 formed in a drawer structure 13 slidable on rails 14 between an accessible, non-compacting position shown in dotted lines in FIG. 1 and a compacting position shown in full lines. Housing 11 also encloses a ram 16 carrying a motor 18 and driving a chain 20. Chain 20 wraps three, triangularly disposed drive nuts 22 (only two of which are shown in FIG. 1) which engage stationary screw-threaded rods 24. The housing 11 is also provided with an upper door 26, pivotally mounted to move between the positions shown in FIG. 1. Received within the receptacle or drawer 12 there may be a liner 32 (FIG. 2) which includes a pair of cooperating sections 34 and 36 (FIG. 6), each formed of a substantially rigid material such as polyethylene. Section 34 includes a bottom 38, upstanding side walls 40, and end walls 42 and 44. Walls 40 and 42 are of substantially the same height as the walls of the receptacle 12, but upstanding wall 44 is appreciably shorter than the remaining walls as shown.

Section 36 also has a bottom 38a and includes upstanding side walls 40a and end walls 42a and 44a. Walls 40a and 42a are substantially the same height as that of the container 12, and wall 44a is appreciably shorter, approximately the same height as the wall 44. The bottom of section 36 is somewhat smaller than section 34, to nest therein and cooperatively to define a complete liner assembly.

It will be noted that the liner is provided with handles 56 and 58 formed in the sections 34 and 36, respectively. Additionally, the drawer or sliding receptacle 12 is provided with a notch 60 in each of its upper edges of its side walls, only one of which is shown in FIG. 1, with the handles 56 and 58 aligned with and accessible through notches 60. Finally, it will be noted that each of the sections is provided with ribs 62 integrally formed on the exterior surfaces of the liner sections and extending from the tops thereof to points spaced from the bottom walls thereof.

Figure 7:
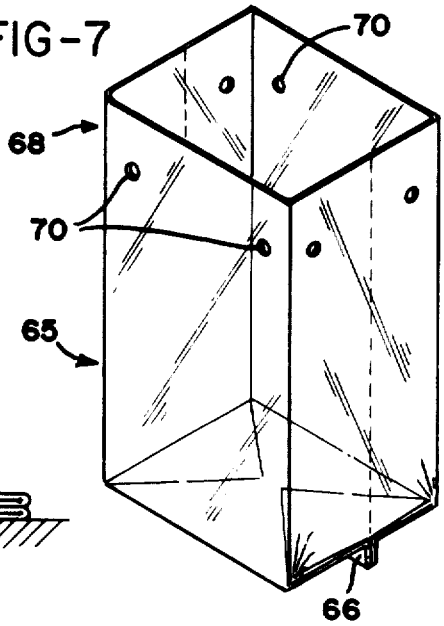
FIG. 7 is a perspective view of a bag as provided by the invention.
Figure 8:
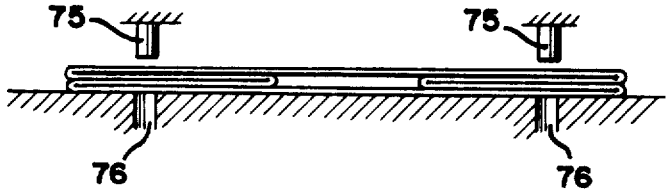
FIGS. 8 and 9 are schematic diagrams showing one manner by which the bags can be made.
Figure 9:
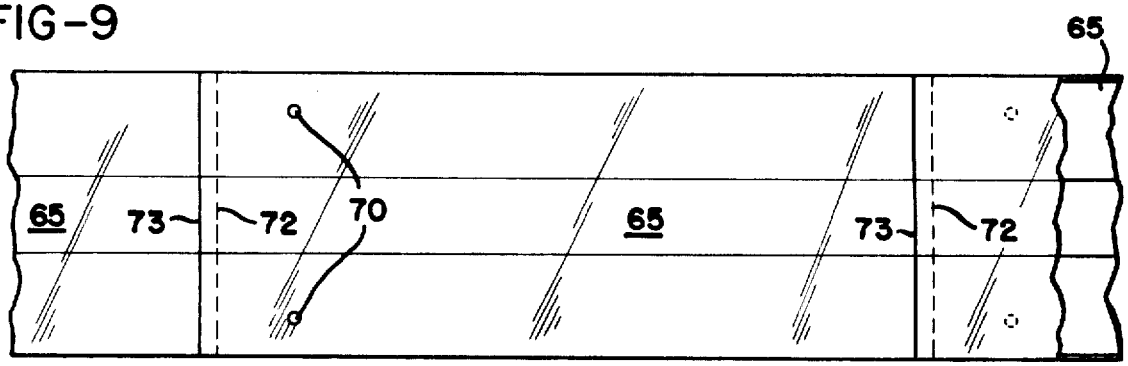

An important feature of the present invention is the disposable tubular bag, made of seamless sheet material, which is used to receive the trash to be compacted. FIG. 7 is a perspective view of such a bag 65, and FIGS. 8 and 9 illustrate the manner in which these bags can be constructed from a seamless tube of plastic sheet material, such as polyethylene. The bag is shown in FIG. 7 in a fully erected form, with the folded lower end of the bag having a sealed seam 66, preferably formed as a heat seal, and also having an upper cuff portion 68 with a number of appropriately placed holes 70 which serve to retain the bag in position within the compactor, as presently described. In a successfully used embodiment of the invention, bags were formed of seamless polyethylene having a thickness of from 4 to 6 mils, by forming a tube of material to produce infolds at each side of the tube, producing a flattened sheet of four thicknesses at the sides and two thicknesses in the center, essentially as shown in FIG. 8. This is a conventional way of forming such material into a connected series of bags sealed at one end. Such an arrangement is indicated in FIG. 9, wherein the perforated lines 72 indicate partially severed connections between successively formed bags, and the solid lines 73 indicate heat seals formed across the material to form the sealed ends 66.

This is customarily accomplished by engaging the moving web or tube of material with a heat sealing device (not shown) and in accordance with the present invention the holes 70 may be formed through the material at the same time. Thus, the bags can be formed by conventional methods and machinery, with only minor changes in the mechanism required. This involves the addition of a pair of punches 75 and corresponding die holes 76 (FIG. 8) which can be mounted to reciprocate with the heat sealing device, so as to perforate the tube or web of the plastic material at the same time the heat seal is formed. In order to form the holes 70 sufficiently spaced apart in the wider sides of the bag, as shown in FIG. 7, the perforations are made at a location where four thicknesses of the folded tubular material are presented to the punch and die sets. This merely causes extra holes in the narrower walls of the bag, as shown in FIG. 7, but these are of no particular need in the present invention.

Figure 3:
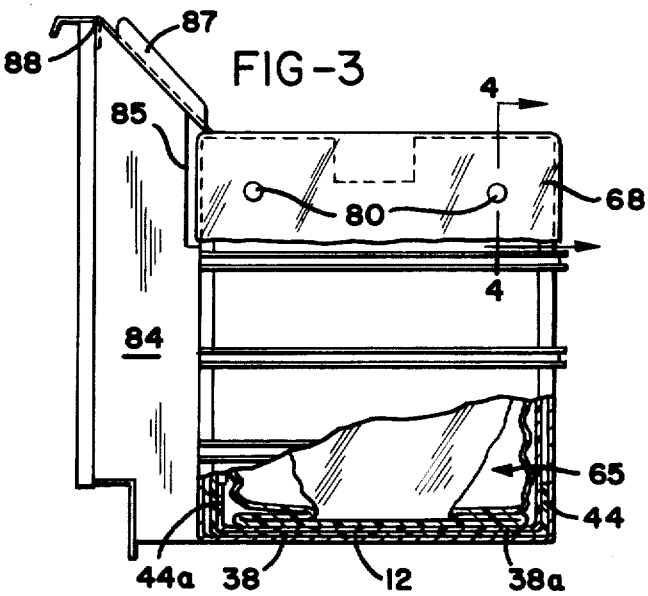
FIG. 3 is a view of the drawer partially in section showing details of the bag assembled in the container.
Figure 4:
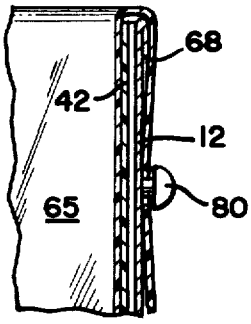
FIG. 4 is an enlarged fragmentary sectional view of the bag cuff mounted over the edge of a container incorporating a removable liner.
Figure 5:
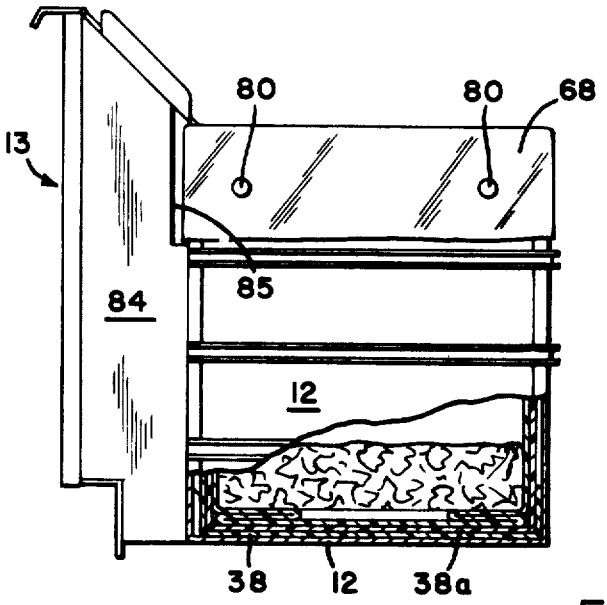
FIG. 5 is a view similar to FIG. 3, showing some compacted material in the bag.

In a typical embodiment the receptacle is approximately 18 inches deep, and the liner members will likewise be of about the same depth in those instances where the separable liner is used. The bags are formed considerably longer, for example, in the order of 30 to 36 inches in length, in the folded form. When the bag is spread to the position shown in FIG. 7, the heat sealed bottom will shorten somewhat, but there is sufficient slack due to excess material that the bag material is bunched in the bottom of the receptacle (or liner) as shown in FIG. 3. This avoids placing any strain upon the heat sealed end of the bag during the compacting operations. The upper cuff portion 68 of the bag is sufficiently long to fold over the upper end of the receptacle, bringing the holes 70 into alignment with retainer projections on the upper exterior side walls of the receptacle 12. These projections preferably are in the form of plastic button members 80, one of which is shown in detail in FIG. 4. The head of the buttom member is somewhat larger than its shank, which is suitably fastened to the wall of the receptacle. This may be done, for example, by a bolt (not shown) extending through the receptacle wall into the buttom member 80. The bag material is somewhat flexible and stretchable, and the size of the hole 70 is preferably made somewhat smaller than the size of the head of the button members, hence the bag material is forced over the head of the button member 80 and this assures that the bag does not accidentally pull off the button member, especially when material is being compacted.

Figure 6:
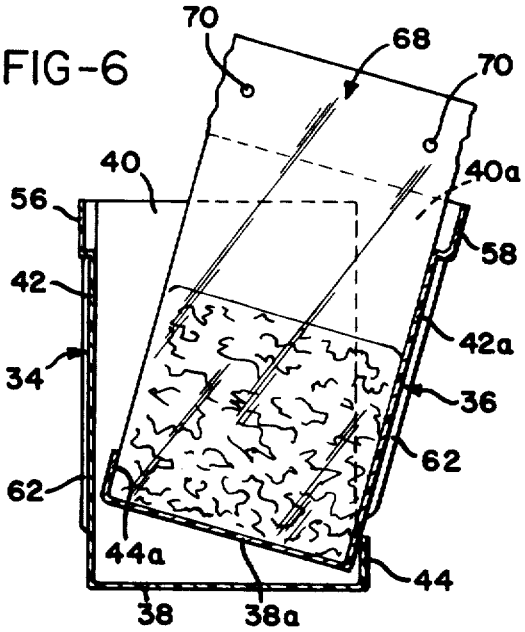
FIG. 6 is a sectional view of the liner removed from the container, and with its parts separated to free a bag of compacted material for disposal.

The front of the drawer 13 includes a compartment formed with side walls 84, and each of these has an appropriate relief 85 allowing the cuff portion of the bag to fit over the front upper end of the receptacle 12. This compartment provides a convenient storage place for a supply of the disposable bags 65, which may for example be provided either in rolls or preferably in fan folded packets which can be kept in the compartment space. The cover 87 for this compartment is hinged to the upper front edges of the drawer structure, at 88, and in its lower position this cover also functions as a chute having a lower edge which extends down past the upper edge of receptacle 12. The region inside the upper door 26 is separated from the ram structure and its drive mechanism by a wall 90, thus providing an area within the front upper portion of the compactor where small or middle size trash articles can be placed without the necessity of pulling the main drawer 13 to its open position each time. When the drawer structure 13 is open, these articles will pass down the cover 87 into the bag within the receptacle. At the same time, the wall 90 prevents any access to the mechanism through the upper door 26, hence there is no danger in placing small articles in this area of the machine, even while it is operating. The main drawer structure, including the receptacle 12 is however provided with suitable safety interlocks and a positive retaining latch (not shown) to assure that the compacting ram can function only when the drawer structure and receptacle is in the compacting position shown in FIG. 1. Details of these arrangements are not illustrated nor described since they do not form a part of the present invention.

Where the separable multi-piece liner is used, once the bag 65 is sufficiently filled with compacted material, it may be detached from the button members 80 and the liner with the loaded bag inside can readily be lifted from the receptacle 12, by withdrawing the liner upwardly essentially to the position shown in FIG. 2. The sections of the liner can then be separated, at least partially, as shown in FIG. 6 to permit easy removal of the bag. The extending cuff portion 68 provides a convenient means for grasping the upper end of the bag, and as the loaded bag is withdrawn, the compacted material will tend to drop into the slack portion of the sealed lower end of the bag, leaving sufficient material at the top of the bag to be folded and tied or otherwise secured in a sealed condition which minimizes odors from material in the bag and assures that any liquids contained therein will be properly retained. As previously mentioned, use of the separable liner member is optional, and it will be apparent from the description and drawings that the bag 65 can be placed directly within the receptacle 12 and secured thereto, in which case the loaded bags will merely be withdrawn upward directly from the receptacle when they are sufficiently full.

It has been found during repeated use of the bag provided by this invention, together with the retaining projections such as the button members 80, that the bag is secured to the upper end of the receptacle in such a way that frictional forces acting against the walls of the bag within the receptacle during compacting, tending to draw the bag material down into the receptacle, are fully resisted by the retaining arrangement, there is little or no tearing of the bag material around the holes 70, and the bags have consistently remained properly attached to the upper end of the receptacle during use. This arrangement has been tested through thousands of compacting cycles, and over a thousand of the bags have been successively loaded with compacted trash in accordance with this disclosure, with practically no failures of the bag retaining arrangement.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. [For use in] *In* a trash compactor having a housing, a ram mounted in said housing and including a reciprocating drive therefor, and a container having rigid walls positionable in said housing beneath said ram to receive items of trash for compaction in said container by movement of the ram into said container, said container having *outwardly projecting* buttons on the exterior of opposite sides thereof;

a disposable trash receiving bag [fittable] *fitted* within said container and including an upper cuff portion of sufficient length and width [to be] reverse folded *over and* around the upper edge of said container, and said bag having holes in said cuff portion [providing a means of engagement] *engaging* over the buttons on said container [to hold] *and holding* the bag in position on said container against forces tending to draw said cuff portion thereof into the container as trash is compacted within the bag and against the restraint of the container walls.

2. [A bag for use in a trash compactor] *A trash compactor* as defined in claim 1, wherein said bag is formed as a seamless tubular member of plastic material having the end thereof opposite from said cuff portion sealed to form a liquid tight lower end of the bag, said bag being substantially greater in length than the depth of the container providing for folding of said cuff portion about the upper edge of the container and in addition providing an excess quantity of bag material at said lower end thereof within the container whereby compacted trash within the bag will settle into such excess portion of the bag as the bag is removed from the container.

3. In a trash compactor having a housing, a ram mounted in said housing and including a reciprocating drive therefor, an access door opening to the interior of the housing in the region beneath said ram, and an open top container having rigid walls positionable in said housing beneath said ram to receive and restrain items of trash for compaction in said container by movement of the ram into said container, said container having retainer projections *directly outwardly* from the exterior of its top on opposite sides thereof; the improvement comprising a thin flexible trash receiving bag fittable within said container and including an upper cuff portion of sufficient length and width to be reverse folded *over and* around the top edge of said container, and said bag having holes in said cuff portion engaging over said projections on said container to hold the bag in position on said container against forces tending to draw said cuff portion thereof into the container as trash is compacted within the bag against the restraint of said container walls.

4. A trash compactor as defined in claim 3, including a removable rigid liner of a plurality of interfitting separable parts within said container and receiving said bag, said container walls providing the restraint for the liner and said bag against compacting force, and said liner being removable and separable to release a full bag from the compactor.

*5. A trash compactor as defined in claim 1, including a removable rigid liner of a plurality of interfitting separable parts within said container and receiving said bag,*

*said container walls providing the restraint for the liner and said bag against compacting force,*

*and said liner being removable and separable to release a full bag from the compactor.*

* * * * *